Nov. 1, 1932. T. WAUGH, JR 1,885,660
METHOD OF AND APPARATUS FOR MANUFACTURING GLASSWARE
Filed June 7, 1928    6 Sheets-Sheet 6

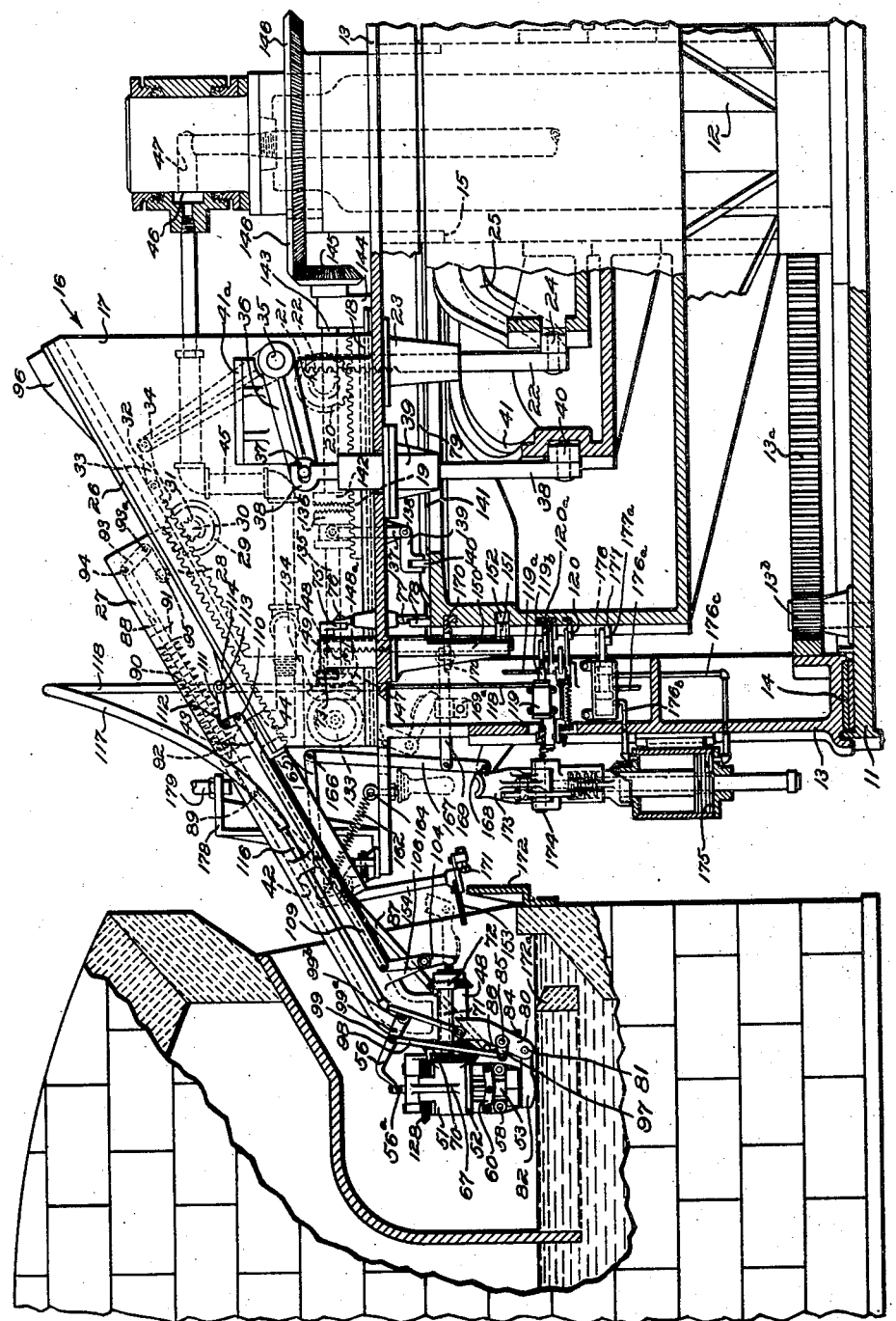

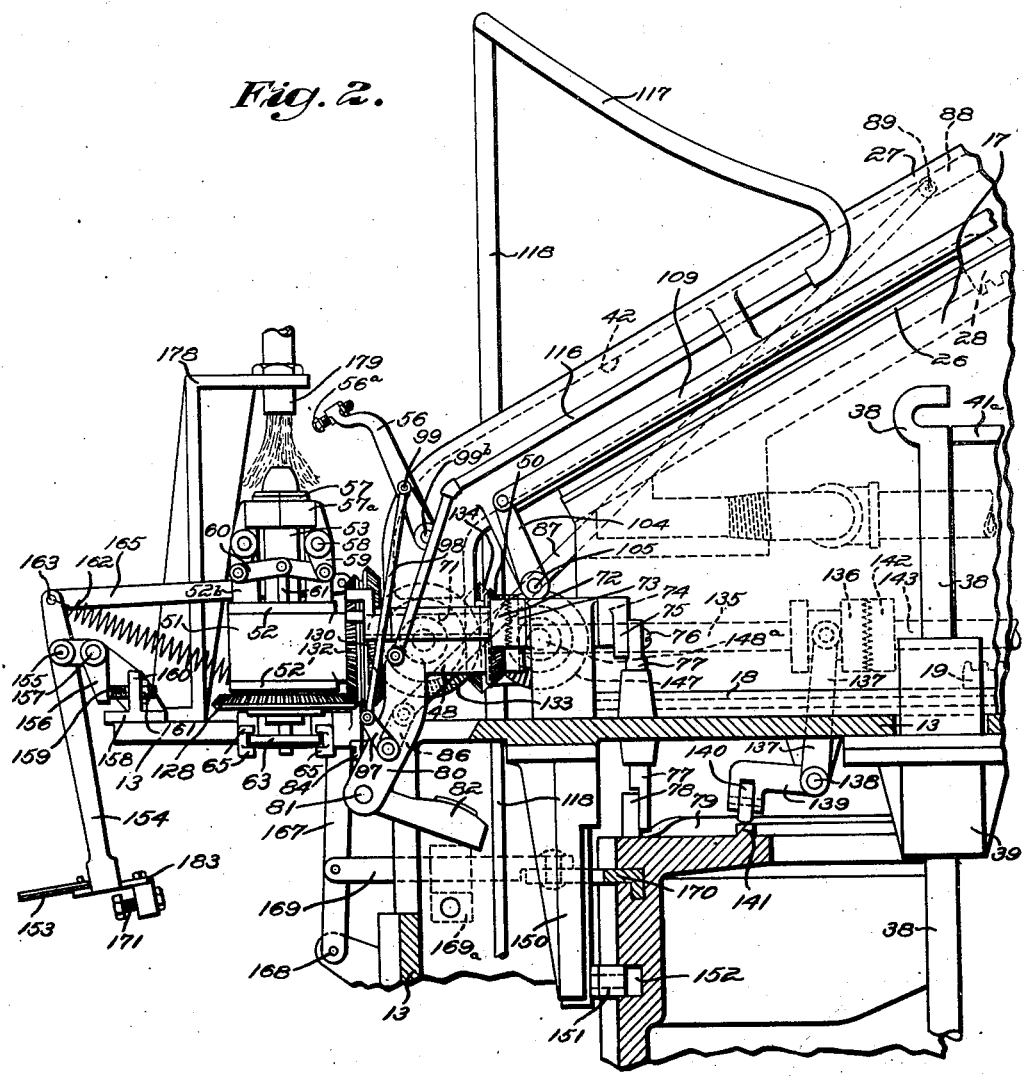

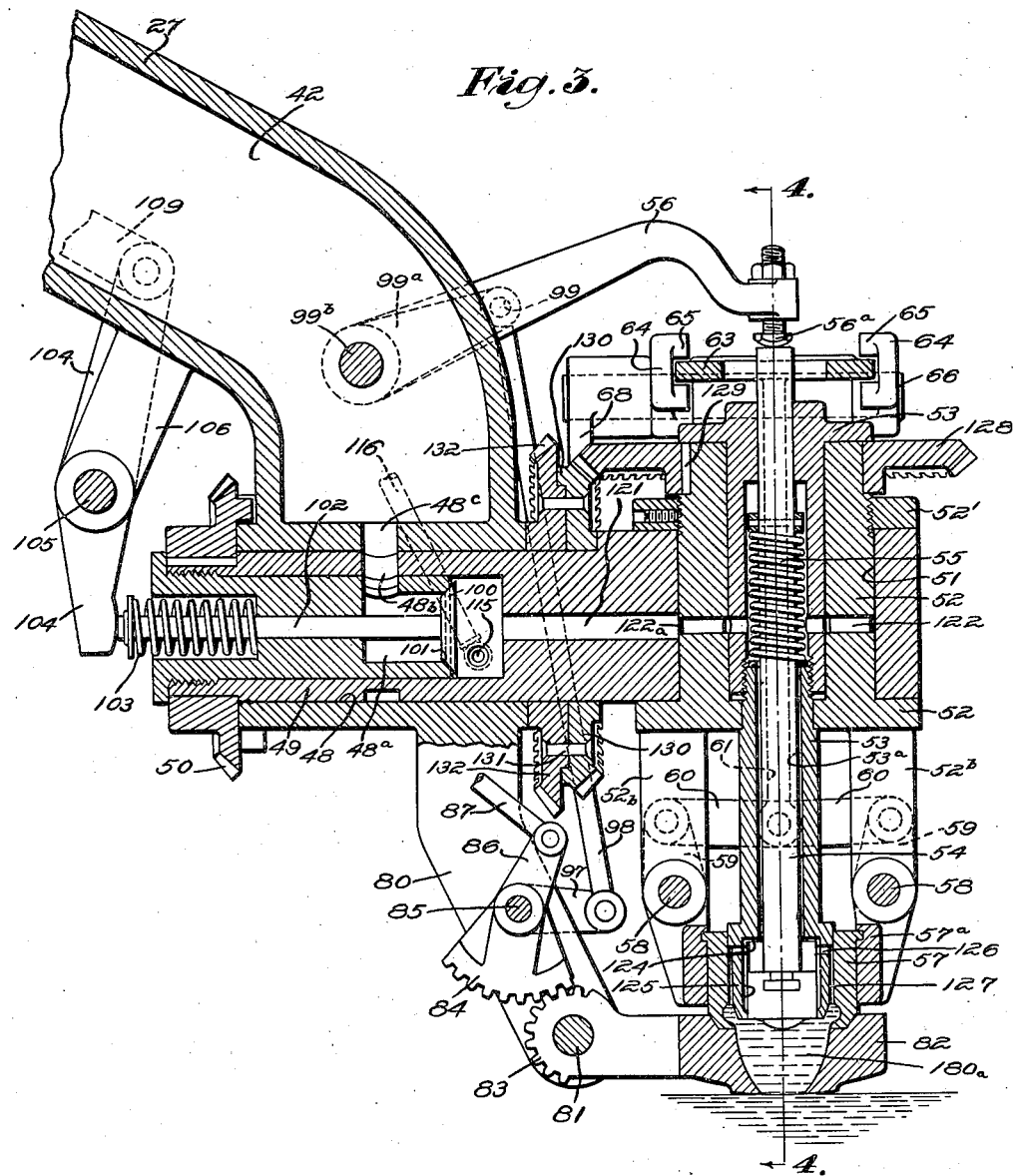

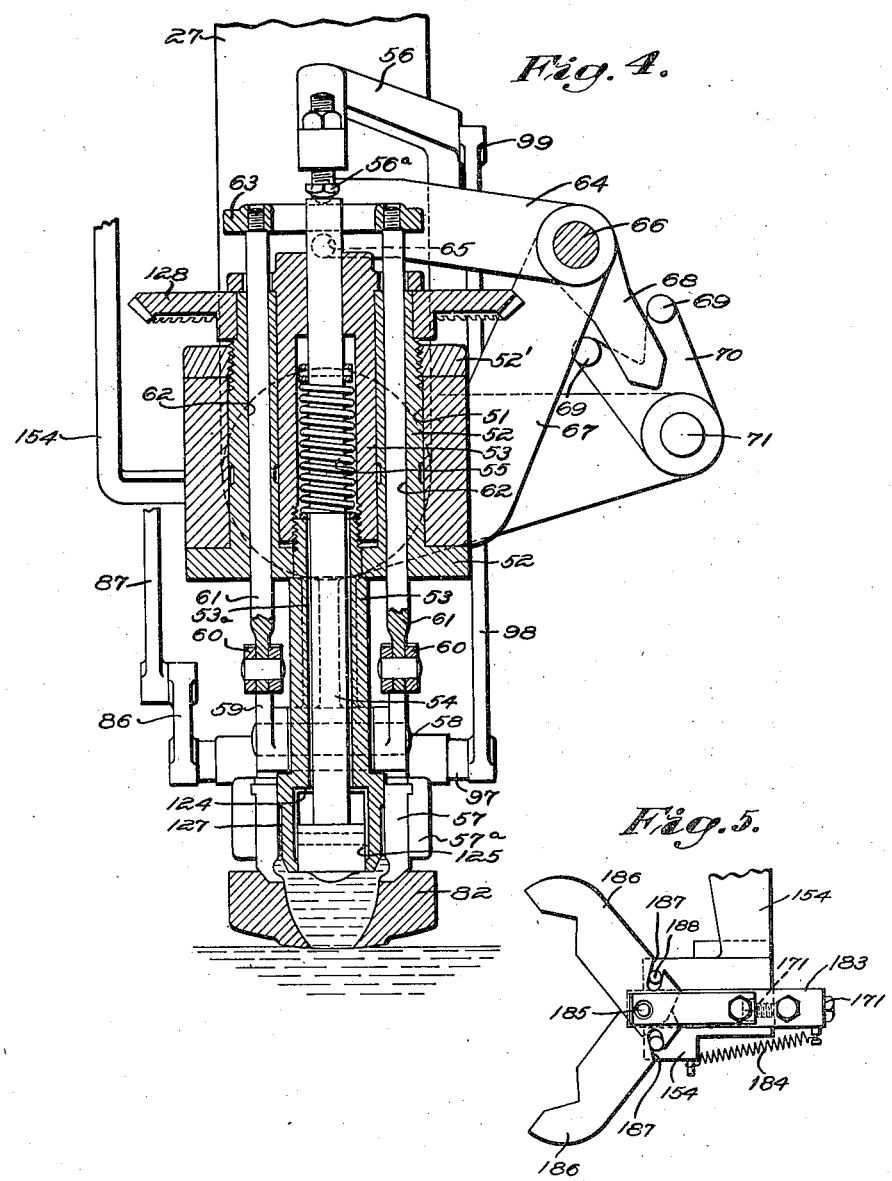

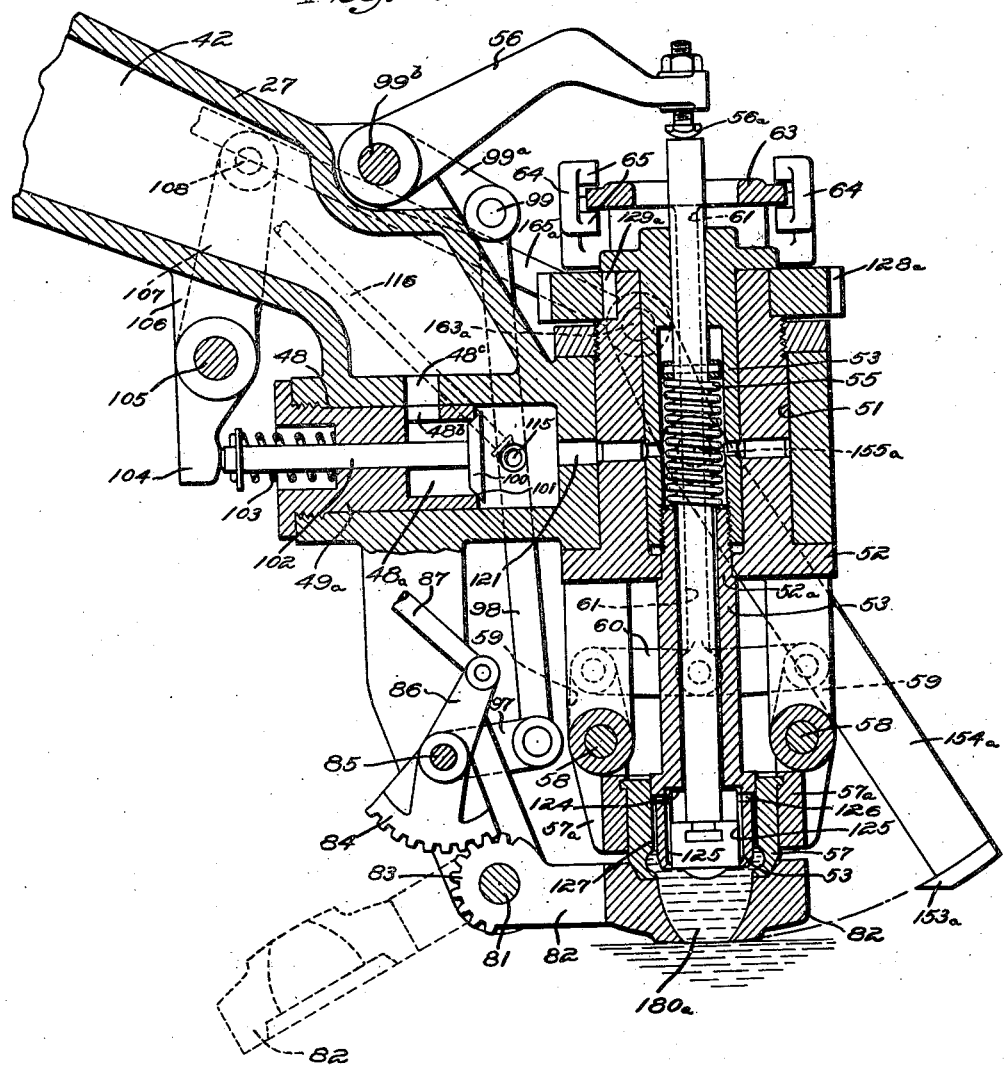

Inventor;
Thomas Waugh Jr.
by Robson D Brown
Attorney

Witness.
Winslow B Thayer

Patented Nov. 1, 1932

1,885,660

UNITED STATES PATENT OFFICE

THOMAS WAUGH, JR., OF HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR MANUFACTURING GLASSWARE

Application filed June 7, 1928. Serial No. 283,595.

This invention relates to apparatus for manufacturing glassware and more particularly to that type of machine which obtains its charges of glass by suction from the surface of a glass pool and which forms the ware in a paste mold in which the blank is rotated as it is blown to finished form. It more especially relates to the manufacture of electric lamp bulbs.

It is one of the objects of the invention to provide a single structure which will operate both as a suction gathering head and as a blowhead, thus obviating the necessity of transferring the blank from one piece of apparatus to another during the forming operation. By thus omitting all transferring operations, the time required for forming the ware is reduced, with the consequent reduced chilling of the blank and reduced imperfections because of the reduced number of operations.

It is also one of the objects of the invention to provide an improved method of and apparatus for feeding, blank forming, reheating and blowing a charge of glass whereby the time required for the operations is reduced, the product is improved both because of quicker handling and improved method of handling and the apparatus itself is simplified.

Another object of this arrangement is to provide improved means for applying suction to the uppermost portion of the mold cavity whereby complete filling of the mold is assured. These and other objects of the invention will more fully appear in the consideration of the detailed embodiments hereinafter described.

A brief description of the general plan of operation will be given here as a guide for the more detailed consideration of the drawings and the various parts disclosed therein. The machine is of that type in which a rotating turret or table carries a plurality of forming units. Each unit comprises a radially reciprocating carriage which in turn carries a ram reciprocating along an inclined path. The ram carries at its outer end a gathering mechanism which also serves as a blowhead when the ram and carriage are retracted to their innermost radial positions.

Means are provided for introducing a vacuum into the gathering head when the latter is in its outermost or gathering position. After such gathering operation has taken place, the ram is retracted, shears cut off the thread of glass connecting the gather and the supply, the bottom mold is moved out of cooperative relation with the gathering head and the glass supported by the latter, and heating means are applied to the chilled portion of the glass. This heating may be applied with the gathering head in the same position with respect to a horizontal axis as when the glass was gathered, or it may be rotated 180° around a horizontal axis and the heating means applied in this inverted position, one form of apparatus showing heating applied in the inverted position and a modification in the non-inverted position. In both forms, means are provided for introducing pressure into the gathering head, which is now operating as a blowhead, and for rotating the glass blank and a supporting portion or neck ring of the blowhead around a vertical axis for cooperation with a paste mold. It will be understood that the form of apparatus which involves heating in an inverted position requires the head to be rotated around a horizontal axis from its gathering position to the heating position and again rotated through 180° to bring the gathering head into the original position. With the foregoing synopsis as a background, reference is made to the acompanying drawings, in which:

Figure 1 is an elevation partly in section of a glass forming machine with a combined gathering head and forming mechanism in which there is embodied one form of the present invention, the gathering mechanism being shown in position at a gathering station;

Fig. 2 is an enlarged sectional elevation of the gathering head in its retracted position and inverted;

Fig. 3 is a sectional elevation still more enlarged of the suction gathering head of Fig. 2 as viewed from the opposite side but not in the inverted position;

Fig. 4 is a sectional elevation through the combined gathering head and blowhead taken on the line 4—4 of Fig. 3;

Fig. 5 is a detailed plan view of the shear mechanism;

Fig. 6 shows a modified form of the invention in which the gathering head is not rotated around a horizontal axis, the view shown being similar to Fig. 3 of the inverted form;

Figure 7:
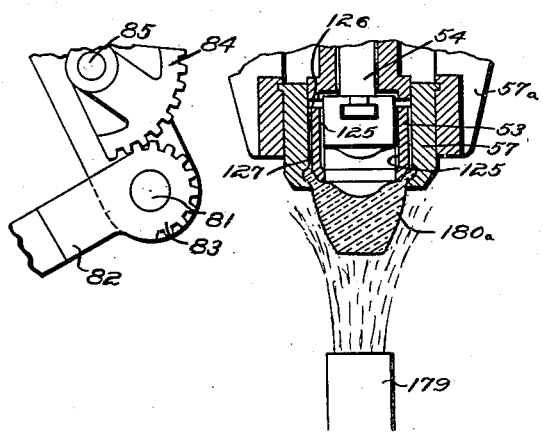
Fig. 7 is a detailed view of the modification of Fig. 6 showing the glass blank undergoing the initial reheating operation.

Reference character 11 indicates the frame of a glass forming machine having a central portion 12 around which rotates a turret or table 13 which cooperates with the frame 11 by means of step bearings 14 and 15. The table 13 may be provided with an internal gear 13a driven by a pinion 13b supplied with power from any suitable source. The table 13 carries a plurality of forming units, one of these being indicated generally at 16. Each unit 16 comprises a carriage 17 which is movable in radial guides 18 on the table 13. Provision is made for operating the carriage 17 by a rack 19 secured to the carriage 17 and a gear 20 rotatably mounted on the table 13. Secured to the gear 20 is a pinion 21 which is driven by rack 22 slidably mounted in the guide 23 supported by the table 13. To the lower portion of the rack 22 is pivoted a cam roller 24 which is operated by the stationary cam 25 which is a part of the central portion 12 of the frame 11. At the upper portion of the carriage 17 there may be provided an inclined guide 26 in which there is mounted for reciprocating movement a ram 27. Provision is made for reciprocating the ram 27 by means of a rack 28 secured to the ram, which rack in turn is driven by a gear 29 secured to a shaft 30. Also secured to the shaft 30 is a pinion 31 which is driven by the rack 32 which is mounted in the carriage 17 for sliding movement parallel to the guide 26. One end of the rack 32 is connected by a link 33 to one arm 34 of a bell crank lever. This bell crank lever is pivoted to the carriage 17 at 35 and its other arm 36 is provided with a pin 37 which enters into a hook-like projection of the rod 38 which is slidably mounted in a guide 39 on the table 13. On the lower end of the rod 38 is pivoted a cam roller 40 which is operated by the groove cam 41 provided on the central portion 12 of the stationary frame. It is desired that the carriage 17 be not moved from its outermost radial position toward the center of the machine until the ram 27 have been moved to its uppermost position. When the ram occupies its uppermost position, the pin 37 is also in its uppermost position and opposite a horizontal supporting bracket 41a (Figs. 1 and 2). The inward horizontal movement of the carriage 17 will, therefore, withdraw the pin 37 from the hooked end portion of the rod 38 and move it toward the right, as may be understood from a consideration of Figs. 1 and 2, but the pin 37 and the ram 27 will be sustained against a downward movement by the support afforded by the bracket 41a.

A duct 42 may extend through the interior of the ram 27 and is used in connection with the application of vacuum to the suction gathering head. The duct 42 has a port 43 which cooperates with a similar port 44 on the carriage 17 when the ram is in the gathering position, Fig. 1. A suitable conduit 45 connects the port 44 with a rotary slide valve 46. The valve 46 registers with an aperture 47 in the stationary central portion 12 of the frame when the table has rotated to that position in which the ram is operated for gathering the charge of glass. The blow head and neck mold constructions are as follows:—At the lower end of the ram 27 is provided a horizontally disposed sleeve or bearing 48 which carries a shaft or supporting member 49 which, in turn, is provided with a vertically disposed bearing or sleeve 51 in which is carried a vertical supporting member, shown as being a sleeve 52, the lower end of which is enlarged as shown, and the upper end of which is provided with a collar 52' to provide against longitudinal movement of the sleeve, Fig. 3. Within the sleeve 52 is mounted a two-part hollow member or sleeve 53, the two parts thereof being so constructed as to provide shoulders above and below the sleeve 52. Within the tube or sleeve 53 is mounted a neck pin or plunger 54, the stem of which passes upward beyond the sleeve and provides a bearing surface for an adjustable driving head 56a mounted on an arm 56. The plunger is surrounded by a compression spring 55 which works against the upper surface of the lower portion of the tube 53 and against a pin or extension on the plunger and tends to press the plunger upwardly. The spring is compressed when the plunger is moved downwardly through the movement of the arm 56.

A neck ring 57 is provided which, as shown, consists of two parts, and each part is carried by a neck-ring holder 57a which holders are pivoted, as at 58, to ears or extensions 52b of the vertical supporting member 52. Each neck-ring holder 57a is provided with upwardly extending arms 59 which are connected by links 60 to vertically movable operating members 61, Fig. 4. The members 61 pass through guiding apertures 62 in the vertical supporting member 52 and are connected at their upper ends by a cross piece 63. The cross piece 63 is operated by a bell crank lever 64 having lugs 65 which engage the cross piece 63. The bell crank 64 is pivotally mounted at 66 on a bracket 67 extending from the vertical supporting member 52. The other arm 68 of the bell crank lever is operated by automatically disengaging means, such as the pins 69 on the bifurcated arm 70 which is carried by one end of the shaft 71. The other end of the shaft 71 may be provided with a saw tooth clutch 72 which is engaged by a similar clutch member 73 when the ram and carriage are both in their innermost radial positions. The clutch member 73 is secured to a shaft 74 rotatably mounted in bearings on the table 13. Extending from the shaft 74 is an arm 75 to which is pivoted at 76 a reciprocating rod 77 carrying at its lower end a cam roller 78 which is actuated by the cam 79 on the stationary part of the frame 11.

The construction of the body mold and its operating means are as follows:—Depending from the outer portion of the ram 27 are arms 80 in which is secured a shaft 81 on which is rotatably mounted the suction mold 82 (Fig. 3). The suction mold is provided with a gear 83 which is driven by a segmental gear 84 secured to the shaft 85 rotatably mounted in the arms 80. Secured to the shaft 85 is an arm 86 which is operated by a link 87 which is pivoted to the reciprocating rod 88 at 89, Fig. 1. A spring 90 disposed between the lug 91 on the ram 27 and a collar 92 on the rod 88, tends to move the rod 88 downward and to keep the mold in the closed position. The rod 88 is retracted against the action of the spring by means of a bell crank lever 93 pivoted at 93a to the ram 27, one arm of the bell crank lever being pivoted at 94 to the rod 88 and carrying on the other arm a cam roller 95 which cooperates with the wedge cam 96 mounted on carriage 17 to retract the rod 88 and open the suction mold.

To operate the neck pin, one end of an arm 97 is secured to the shaft 85 and its other end is pivoted to a connecting link 98 which is pivoted at 99 to an arm 99a secured to a shaft 99b which also carries the arm and the neck pin 56 and operates this arm simultaneously with the operation of the suction mold.

The vacuum connection heretofore described, as made with the passage 42 in the ram 27, is completed to the neck ring and mold as follows: A chamber 48a within the shaft 49 is in communication with the passage 42 through the ports 48b and 48c in the shaft 49 and the bearing 48 respectively, Fig. 3. A passage 121 from this chamber 48a through the shaft 49 communicates with an annular groove 122a in the vertical sleeve 52, which annular passage in turn communicates by ports 122 with the interior of the tube 53. The neck pin or plunger 54 fits in the tube 53 with sufficient looseness to provide passages 53a connecting the ports 122 with passages 124, 125, 126 and 127 formed within the neck ring. The passages 124 and 126 are horizontal radial passages formed in the tube 53 and 125 and 127 are vertical passages formed between the tube and neck pin and the tube and neck ring respectively. As shown, the passages 125 are longitudinal grooves, while the passage 127 is annular.

The application of vacuum through the passages described is controlled at one end of the chamber 48a by a valve 100 cooperating with its seat 101, Fig. 3. This valve is of the poppet type and is provided with the stem 102 passing through and out of the end of the shaft 49. The extending portion of the valve stem is surrounded by a compression spring 103 which constantly urges the valve toward its seat. Pivoted at 105 to an ear 106 integral with the ram 27 is a lever arm 104, one end of which contacts with the end of the valve stem 102 and the other end of which is provided with a link 109. The other end of the link 109 is pivoted at 110 to one end of a bell crank lever 111, Fig. 1. The bell crank lever 111 is pivoted at 112 to the ram 27 and its other end carries a cam roller 113 which is actuated by the wedge cam 114 mounted on the carriage 17. Thus when the roller 113 is raised by contact with the cam 114, the arm 104 is moved to compress the spring 103 and open the valve 100, and the suction passage is then complete from the neck ring and mold to the source heretofore described. At the time this vacuum is applied, however, the neck pin 54 is in its lowest position which, as shown in Fig. 3, blocks the communication of the passages 125 with the mold except for a slight clearance which permits suction to be applied to the glass below the plunger. The suction is, therefore, applied chiefly through the neck ring to the mold through the outer passages 126 and 127. This particular arrangement has the advantage of assuring that glass is drawn definitely into the outer and upper portions of the neck ring, which operation assures the proper attachment of the charge of glass in the neck ring.

Blowing air is applied to the blowhead in two different ways. For the initial or puff blowing operation, a cylinder 119 is provided which has a piston operated from a suitable cam 120 on the stationary portion of the frame, Fig. 1. The air which is compressed in the cylinder 119 is discharged through a conduit 118. After the puff blowing operation or operations, the subsequent blowing air is received through a supply pipe 119a from any suitable source of constant air pressure (not shown) and is controlled by a valve 119b. From the valve 119b the blowing air passes through the conduit 118 in the same manner as the puff blowing air.

The valve 119b is operated by a cam 120a carried on the stationary portion 12 of the frame. The supply pipe 119a may make connection with a stationary part of the frame in a manner somewhat similar to that shown for the vacuum. In either case, the air passes through the conduit 118, flexible pipe 117, conduit 116 to the central chamber in the shaft 49, the air entering this chamber beyond the valve 100 through a port 115, Fig. 3. From this point the connections to the neck ring are the same as previously described in connection with the application of vacuum. The pressure, however, is to be applied at the time that the neck pin is lifted, wherefor the passages 125 are open and the blowing air may be applied therethrough. The air also tends to pass through the neck ring to the mold through the passages 127, but at the time the pressure is applied, these passages have been substantially closed by the freezing of the upper portions of the glass previously sucked into the upper and outer portions of the neck ring, so that the effective blowing pressure is applied only through the passages 125.

The application of pressure air is suitably timed by the cams 120 and 120a cooperating with their cam rolls which operate the piston rod of the puff cylinder 119 and the stem of the valve 119b respectively, and, as hereinafter, noted, these cams may be of such contour as to apply the air intermittently during the blowing period or continuously during such period or in any one of a plurality of suitable ways dependent upon the effects desired in the ware.

Provision may be made for the rotation of the supporting member 52 and associated parts around a vertical axis in its bearing in the horizontal supporting member 49. As best seen in Fig. 3, a bevel gear 128 is keyed to the supporting member 52 at 129 and meshes with a bevel gear 130 rotatably carried by the horizontal supporting member 49. Rigidly fastened to the gear 130, as by rivets 131, is another bevel gear 132. When the ram has moved to its upper position on the inclined guide and the carriage to its innermost radial position, the gear 132 will be brought into mesh with a bevel gear 133, as best seen in Fig. 2. The gear 133 is mounted in suitable bearings on the rotatable table 13 and meshes at all times with a bevel gear 134 secured to the shaft 135 which is also carried by suitable bearings on the table 13. Mounted on the shaft 135 is one member 136 of a clutch. This member 136 is slidably but non-rotatably carried by the shaft 135 and is moved longitudinally thereon by one arm 137 of a bell crank lever which is pivoted to the table 13 at 138. The other arm 139 of the bell crank lever carries a cam roller 140 and cooperates with a cam 141 on the stationary portion 12 of the frame 11. Cooperating with the member 136 of the clutch is a corresponding member 142 secured to the shaft 143 which is suitably journaled in bearings 144 on the table 13. A bevel gear 145 is secured to the shaft 143 and meshes with a bevel gear 146 secured to the stationary portion 12 of the frame, whereby gear 145 and shaft 143 are rotated as the table revolves around the stationary portion 12.

Provision may be made for rotating the gathering head 180° about a horizontal axis through the intermediary of the bevel gear 50 keyed to the shaft 49. When the ram 27 and the supporting carriage 17 are both in their innermost positions, the bevel gear 50 meshes with a bevel gear 147 which is rigidly secured to a spur gear 148, both gears 147 and 148 being suitably mounted for rotation about a shaft 148ª mounted in bearings on the table 13. A rack 149 is slidably mounted in a suitable guide 150 on the table 13 and carries at its lower portion a cam roller 151 which is actuated by the cam 152 on the stationary portion 12 of the frame, Fig. 1.

Suitable means are provided for cutting off the depending thread of glass when the gathering head is in the position shown in dotted lines in Fig. 1 and comprises shear blades 153 carried by an arm 154. The arm 154 is pivoted at 155 to one arm of an adjustable bell crank lever 156 which is, in turn, pivoted at 157 to a supporting bracket 158 carried by the table 13. The pivotal point 155 on the bell crank lever 156 is adjusted in position by a stud 159 threaded through an arm 160 of the bracket 158 and the stud is locked in position by a lock nut 161. A spring 162 is fastened at one end of the arm 154 at 163. The other end of the spring is fastened at 164 to some suitable portion of the table 13 and moves the arm 154 into the farthest position in the furnace permitted by the cam presently to be described.

One end of a link 165 is pivotally connected to the arm 154 at 163 and has its other end pivotally connected at 166 to the upper end of an operating lever 167, the lower end of which is pivoted at 168 to a bracket extending from the table 13. Intermediate the two ends of the operating lever 167 is pivoted one end of a link 169 free to reciprocate in the guide 169a and carrying at its other end a cam roller which cooperates with a cam 170 carried by the stationary portion 12 of the frame. At the proper time in the rotation of the table 13, the cam 170 permits movement of the sheer arm 154 under the action of the spring 162 into the boot for performing the shearing operation.

Within the furnace and submerged in the glass at the gathering point is a refractory skimmer block 172a which serves to separate the glass at the gathering point from the glass near the outer edge of the tank. This block is provided so that the thread of glass cut upon each gathering operation of the apparatus will fall into the tank outside of the immediate gathering pool and will be again subjected to the heat treatment of the furnace before it is again presented at the gathering station.

Each section of the machine is provided with a finishing mold 173 mounted on the rotating table 13. This mold is preferably of the paste mold type and is constructed of similar halves hinged about a common horizontal axis 174 and operative through suitable linkage by an air cylinder and piston 175 mounted on the table 13. Air to operate the piston to open and close the mold is supplied from a constant source through pipe 176a through slide valve 176 and pipes 176b and c going respectively to points above and below the piston. The valve 176 is operated at suitable times from a stationary cam 177 cooperating with a cam roll 177a upon the valve stem.

A suitable burner 179 is mounted on a bracket 178 which is fixed to the rotating table 13 to reheat the blank after the removal of the suction mold and during the blowing operation. This burner is supplied with fuel from any suitable source (not shown) and may be regulated in the usual way to provide a flame of the intensity and force desired for the particular operation.

The shearing mechanism may be of any suitable form and, as shown, comprises a guide in the lower portion of the arm 154 in which is mounted for reciprocation a slide 183. A tension spring 184 is connected between the slide 183 and a point on the arm 154 and tends to maintain the slide in a position to the left, as seen in Fig. 5. Pivotally connected with the slide 183, as at 185, are shear blades 186 each having a laterally extending slot 187 cooperating with a pin 188 on the lower portion of the arm 154. An adjustable stud 171 is carried on the under side of the slide 183, and when the arm 154 is swung into the boot, the stud 171 strikes against a projection 172 carried by the furnace, thereby preventing further movement of the slide 183 while the arm 154 continues to move a little further into the furnace. The shear blades are thus closed to sever the thread of glass between the charge and the pool. As seen in Fig. 4, the arm 154 is offset to lie outside of the path of the gathering head during the retraction of the gathering head and its associated mechanism.

In Fig. 6 is shown a modified form of gathering and blowing head. The structure of this modification is substantially the same as that of Figs. 1 to 4, inclusive, the chief difference between the forms residing in the fact that no means is provided in the form of Fig. 6 for rotating the head, all of the operations of gathering and blowing being performed while the head is in the non-inverted position. Also, Fig. 6 shows a modified form of shearing mechanism which comprises the single blade 153a adapted to sever the glass by passing under and in contact with the lower edge of the suction mold. The blade is carried by an arm 154a pivoted at 155a to an extension of the ram 27. The other end of the rod 154a is pivotally connected at 163a to a link 165a which is adapted to be operated by a cam or other suitable means (not shown) to move the blade 153a into and out of cutting position at suitable times.

Furthermore, the modification of Fig. 6 shows a slightly different means for rotating the gathering head and comprises a spur gear 128a which is substituted for the bevel gear 128 and the gears 130 and 132. The spur gear 128 of the modification is adapted to be driven from a suitable intermeshing gear (not shown) carried on the table 13 and driven in a manner similar to the gear 133 of Fig. 1.

In Figs. 7, 8, 9 and 10, various steps in the formation of glassware are illustrated, more particularly in connection with the non-inverting head form of mechanism of Fig. 6. The method is substantially the same when the inverting form of Fig. 1 is used, save, of course, that certain of the operations are performed while the head is in an inverted position, particularly the operations illustrated in Figs. 7 and 8. In Fig. 7 is shown the lower end of the head at a time after the gathering operation has been completed, the gathering mold has been removed and the ram 27 and carriage 17 are fully retracted. As shown, the blank formed in the suction mold is suspended from the neck ring over the burner 179, and the surface of the blank which has been chilled by contact with the suction mold is being reheated. The neck pin has just been retracted, permitting communication between the air passages 125 and the interior of the blank.

Figure 8:
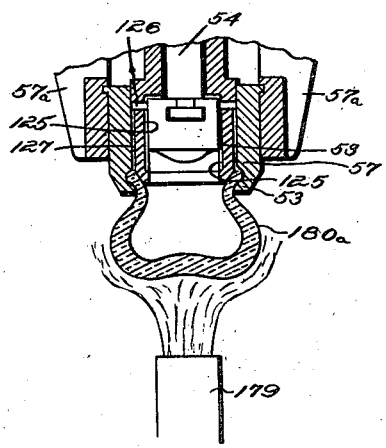
Fig. 8 shows the reheating operation during the puff blowing.

In Fig. 8 is shown a further step in the operation. The blank continues to be reheated while blowing air is being applied through the passages heretofore described, enlarging the bubble or initial cavity in the blank. The burner not only continues to reheat the exterior of the blank but also serves to support the lower end of the blank during this blowing operation to retard elongation. This supporting effect of the flame is of importance in the formation of certain types of articles, particularly electric bulbs, as it has proven desirable to swell the blank laterally in a manner shown in Fig. 8 prior to permitting elongation thereof.

Figure 9:
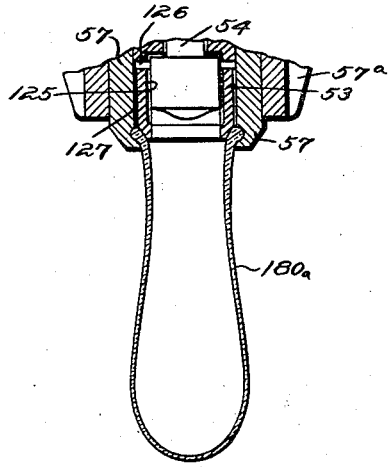
Fig. 9 shows the blank during the secondary blowing operation but before the finishing mold is brought into position.
Figure 10:
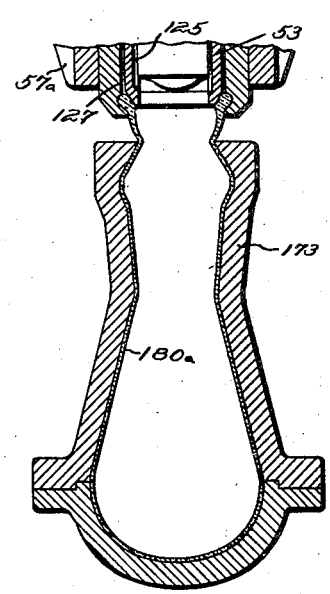
Fig. 10 shows the final blowing with the paste mold in position.

In Fig. 9 the further step in the formation of the ware is shown. The reheating has been discontinued while the blowing continues. The blowing continues and the blank is elongated until, as shown in Fig. 9, its shape approximates the shape of the interior of the paste mold, the blank thus having been formed into a parison. In Fig. 10 the final blowing is shown as being accomplished in the paste mold, the head at this time being rapidly revolved continuously in one direction.

The blowing may be accomplished in different ways as best suited for the particular operations in hand. One desirable way is to provide an initial blow or puff, as it is called, during the period illustrated in Fig. 7. This blowing may be discontinued during a portion of the elongation of the blank, either during or after the heating operation. The blowing air can then be applied to bring the blank to a form such as that shown in Fig. 9. This blowing may be either continuous or intermittent as desired. Similarly, the blowing of the article to final form may be either intermittent or continuous. As stated, in the inverting form of mechanism of my invention the operations of Figs. 7 and 8 are performed with the head in the inverted position. The flattening and lateral swelling of the blank 180a, as shown in Fig. 8, is then accomplished by the combined effects of the blowing air and gravity aided more or less by the dynamic effect of the flame upon the blank. It is to be understood that after this stage of the operation has been completed, the head is reinverted to permit elongation, as shown in Fig. 9.

The operation of the device of Figs. 1 to 4, inclusive, is as follows. The table 13 is given a continuous and uniform movement of rotation about a vertical axis by means of the gear 13b operating through gear 13a. As a particular unit moves toward the gathering station, the cam 25, effective through the cam roller 24 and the racks 22 and 19, causes the carriage 17 to move outwardly to the position shown in Fig. 1. The cam 41 causes an operation of the rod 38 and the connected levers to operate the racks 32 and 28 to project the ram 27 outwardly to bring the suction mold 82 into contact with the surface of the glass. During the outward movement of the ram 27, the cam roller 113 rides up on the wedge cam 114, causing the opening of the valve 100 through the linkage described. This completes the vacuum connection between the suction mold 82 and the aperture 47 and causes a charge of glass to be drawn into the mold and neck ring. As heretofore stated, the suction is applied at the head through the outer passage 127, and this assures a complete filling of the upper and outer portions of the neck ring. The glass drawn into these portions, being of relatively small section, tends to chill more rapidly than the other portions of the glass, thus assuring effective connection of the charge or blank with the neck ring which, as hereinafter pointed out, is to support the blank during the forming operation.

After the gather has been made, the cam 41 lifts the rod 38 and operates the connecting mechanism to cause retraction of the ram 27. During the retracting movement, the shears 153 are moved forwardly to a point beneath the suction mold, the stop 171 striking the projection 172 and closing the shears to sever the thread connecting the gather and the supply of glass. As the severing operation takes place on the side of the refractory block 172a away from the gathering pool proper, the thread which has been chilled during the operation falls outside of the gathering pool and must thereafter pass through further heat treatment in the furnace before the glass composing it can arrive at the gathering station.

After the severing operation, the retracting movement of the ram continues until it reaches its uppermost position. When the cam roller 95 engages the wedge cam 96 to operate the linkage 93, 88 and 87 to rock the levers 86 and 97 about the shaft 85, this rocking movement accomplishes two results, namely, the movement of the suction mold 82 away from the neck ring and the retraction of the neck pin 54 through the mechanisms heretofore described. This leaves the blank suspended from the neck ring and permits communication between the air passages 125 and the interior of the blank in which an initial cavity has been formed by the neck pin. At this point, the cam 24 again causes the operation of the racks 22 and 19 to effect the inward movement of the carriage 17, thus bringing the head directly over the paste mold 173. In this position, the head inverting gear 50 meshes with the gear 147 and the head rotating gear 132 meshes with the gear 133. The gear 147 is then rotated through the rack 149 and spur gear 148 from the cam 152, causing the inversion of the head and presenting the blank carried thereby directly under the burner 179. The blank is then reheated, whereupon the puff cylinder 119 is operated from the cam 120 to admit a puff of air to expand the blank, the expansion taking place while the blank is in the inverted position and while it is being reheated. The blank expands laterally, the outer portion of the blank being flattened somewhat by the dynamic effect of the burner and the effect of gravity. The blowing air may then be discontinued or continued as desired. The rack 149 is again operated to revert the head, whereupon the blank begins to elongate under the influence of gravity. Blowing air is then supplied through the valve 119b until the blank attains somewhat the form shown in Fig. 9, as the result of the elongation and blowing, and until the blank is approximately shaped into a parison to fit the blow mold. At this stage, the piston 175 is operated to raise the blow mold and to close it about the blank, this being accomplished by the admission of air below the piston by suitable operation of the valve 176. At this point in the operation, the cam 141 moves the clutch collar 136 into mesh with the clutch 142, causing the rotation of the gears 132, 130 and 128, thus spinning the head and the blank while the latter is in contact with the blow mold. During this period final blowing pressure is applied through the valve 119b to the connections heretofore described to the parison, and the parison is blown to final form. After the final blowing has been completed, the blow mold is opened and retracted by the means described and the finished article is removed, the neck ring being opened to permit such removal by a rocking of the shaft 71 caused by the cam 79 through the clutch members 72 and 73 which are engaged during the period in which the carriage is in its inward position.

It is apparent that, by suitable selection of the various cams, the operation may be timed as desired to permit wide variations in the order, extent and kind of blowing operations performed. Any or all of the blowing operations above mentioned may be intermittent or continuous.

The operation of the modified form of my device shown in Fig. 6 is substantially the same as that of the form shown in Figs. 1 to 4 inclusive, save that the step of inverting and reverting of the head and the blank is omitted and the entire formation of the article is accomplished while the glass is in the same vertical position in which it is gathered. When the modified form of apparatus is used, it may be desirable to use a burner adjusted to give a reheating flame of greater dynamic force than in the case of the inverting form of mechanism, as this is manifestly opposed rather than aided by gravity during the initial blank blowing period.

It is to be noted that my apparatus and method provide peculiarly advantageous application and control of both the vacuum and the blowing pressure. The arrangement of the vacuum control valve 100 in the gathering and blowhead and in close proximity to the gathering point assures a quick and accurate response at the blowhead which would not be as well accomplished by the provision of the valve at a point further away from the head. This arrangement is peculiarly desirable in such a device as is here shown in which the rotation of the machine is continuous and the contact of the head with the surface of the glass of short duration. The peculiar provision of the vacuum and air passages in the head are, as pointed out, a peculiar advantage in that it assures the complete filling of the neck ring and the proper and firm attachment of the blank to the neck ring. These arrangements also provide that the blowing pressure will be applied directly over the cavity formed by the neck pin which tends to a proper and even distribution of the glass in the article formed. It is also seen that by this device I have done away with the necessity of transferring a blank gathered by suction from the gathering head to a mold, and thus have eliminated excessive chilling with the consequent loss of time necessary to accomplish the transfer and the necessary reheating, and I have thus assured an apparatus and method by which paste mold articles of superior quality may be made with great rapidity and accuracy.

While the hereinbefore described embodiments of the invention have been shown for the purpose of illustration, it is to be understood that various changes may be made therein without departing from the spirit and scope of the invention as defined in the subjoined claims.

I claim:

1. In a process of manufacturing glassware, the steps of gathering a glass charge in a suction mold, inverting the resulting blank, puff blowing the blank, reheating the partially blown blank in an inverted position, reverting the partially blown blank and completing the blowing operation.

2. In a process of manufacturing glassware, the steps of gathering a glass charge by a suction mechanism, inverting the resulting blank, reheating the partially blown blank in the inverted position, reverting the partially blown blank and completing the blowing operation while the blank is still attached to the gathering mechanism.

3. The method of manufacturing hollow glassware which comprises, gathering a charge of glass in a neck mold and an associated body mold from the surface of a pool of molten glass by suction, disengaging the body mold and the gathered charge to leave the major portion of the charge exposed to the atmosphere, expanding the exposed charge while held by the neck mold until the glass approximates the size and shape of a finishing paste mold, closing the finishing paste-mold about the expanded charge and glowing the charge to final form in the finishing mold, while causing relative rotation between the glass supported by the neck mold and the finishing paste-mold.

4. The process of manufacturing glassware, which comprises gathering a charge of glass by suction, whereby a blank is formed attached to a gathering head, reheating the blank, blowing through said head, and expanding the blank laterally while retarding the elongation thereof, by the reheating and blowing operations.

5. The process of manufacturing glassware, which comprises gathering a charge of glass by suction, whereby a blank is formed attached to a gathering head, moving the charge away from the region of the gathering operation, inverting the blank and head, puff blowing and reheating the blank, reverting said head, and completing the blowing operation.

6. Apparatus for forming hollow glassware comprising a neck mold, and a body mold permanently associated with and individual to the neck mold, means for charging said molds from the surface of the gathering pool by suction to form a blank, means for disengaging the blank mold and blank, means for applying air to the exposed blank to expand the blank to a parison of a size and shape approximating the size and shape of a finishing paste mold forming a part of the apparatus, means for closing the finishing paste mold about the parison prior to the opening of the neck mold, means for applying blowing air to the parison to blow it to final form in the paste mold, means for holding the finishing mold closed until the parison is blown to final form, and means for rotating the neck mold to rotate the parison in the finishing mold while said finishing mold remains closed.

7. In a combined suction gathering and blowing device for glass, a suction head, a suction mold and neck mold associated with said head, means for moving the said head and mold into a glass gathering position above a gathering pool, means for creating a vacuum in said head and mold to gather a charge of glass from said pool, means for moving said head and mold into a glass forming position, means for disengaging the suction mold and the blank, leaving the previously formed blank supported by the neck mold, means for applying pressure to said head for blowing the exposed blank, and means for reheating the said blank, said reheating means operating to prevent longitudinal extension of the blank during the puff-blowing operation.

8. In a combined suction gathering and blowing device for glass, a suction head, a neck mold and a blank mold associated therewith, means for moving said head and molds into a glass gathering position above a gathering pool, means for creating a vacuum in said head and molds to gather a charge of glass from said pool, means for moving said head and charge into a glass forming position, means for disengaging the blank mold and blank, means for rotating the head, the neck mold, and previously formed blank attached to the neck mold substantially 180° around a horizontal axis to an inverted position, and means for reheating said glass in the inverted position.

9. In a combined suction gathering and blowing device for glass, a suction head, a neck mold and a blank mold associated therewith, means for moving said head and molds into a glass gathering position above a gathering pool, means for creating a vacuum in said head and molds to gather a charge of glass from said pool to form a blank, means for moving said head into a glass forming position, means for disengaging the blank mold and blank, means for rotating the head, the neck mold, and the blank attached to the neck mold substantially 180° around a horizontal axis to an inverted position, and means for puff blowing and reheating said blank in the inverted position.

10. In a combined suction gathering and blowing device for glass, a suction head, a neck mold and a blank mold associated therewith, means for moving said head and molds into a glass gathering position, means for creating a vacuum in said head and molds to gather glass for a blank, means for moving said head and molds containing the blank into a glass forming position, means for disengaging the blank mold and blank, means for rotating the head, the neck mold, and the blank attached to the neck mold substantially 180° around a horiozntal axis to an inverted position, means for puff blowing and reheating said blank in the inverted position, means for rotating the head and the blown blank 180° to its original position, and means for completing the blowing operation while the blown blank is still attached to the neck mold.

11. In a combined suction gathering and blowing device for glass, a suction head, a neck mold and a blank mold associated therewith, means for moving said head and molds into a glass gathering position, means for creating a vacuum in said head and molds to gather glass for a blank, means for moving said head and molds into a glass forming position, means for disengaging the blank mold and blank, means for rotating the head, the neck mold, and the blank thereto attached substantially 180° around a horizontal axis to an inverted position, means for puff blowing and reheating said blank in the inverted position, means for rotating the head and blown blank 180° to its original position, means for applying pressure through said head and for simultaneously rotating said head and blown blank around a vertical axis.

12. A glass gathering and blowing device for glass, comprising a reciprocating ram, a supporting member mounted in said ram for rotation about a substantially horizontal axis, a second supporting member mounted in said first named member for rotation about a substantially vertical axis, a neck ring carried by said second supporting member, a suction mold removably associated with said neck ring, means for actuating said ram to move said neck mold and suction mold into and out of a position above the surface of a pool of glass, whereby a charge of glass may be gathered in said neck mold and suction mold, and means for applying both vacuum and pressure within said neck ring.

13. In glass working machinery, a rotatable table, a horizontally reciprocating carriage on said table, an inclined guide on said carriage, a ram reciprocating in said guide, a suction mold and neck ring carried by said ram, means for rotating said neck ring about both a substantially horizontal axis and a substantially vertical axis, and means for applying both vacuum and pressure within said neck ring.

14. The method of manufacturing glassware which comprises, gathering a charge of glass in a suction mold and neck mold from the surface of a gathering pool to form a blank, disengaging the suction mold and the blank, leaving the blank supported by the neck mold, and expanding the blank laterally while preventing longitudinal extension thereof while the blank is supported by the neck mold.

15. The method of manufacturing glassware, which comprises gathering a charge of glass in a suction mold and neck mold from the surface of a gathering pool to form a blank, disengaging the suction mold and the blank, leaving the blank supported by the neck mold, directing a flame into contact with the blank to reheat the blank and to prevent longitudinal extension thereof, and puff-blowing the blank to expand the blank laterally.

16. The method of manufacturing glassware, which comprises gathering a charge of glass in a suction mold and neck mold from the surface of a gathering pool to form a blank, disengaging the suction mold and the blank, leaving the blank supported by the neck mold, puff-blowing the blank, directing a flame into contact with the blank to reheat the blank and to prevent longitudinal extension thereof during the puff blowing operation, subsequently elongating the blank by puff-blowing, inclosing the blank in a finishing mold, and blowing the blank to final shape in said mold, all of said operations being performed while the blank is supported by the neck mold.

17. The method of manufacturing glassware, which comprises gathering a charge of glass in a suction mold and neck mold from the surface of a gathering pool to form a blank, disengaging the suction mold and the blank, leaving the blank supported by the neck mold, puff-blowing the blank while directing a flame into direct contact therewith to reheat the blank and to prevent longitudinal extension thereof during the puff-blowing operation, subsequently elongating the blank by puff-blowing, inclosing the blank in a paste mold, and blowing the blank to final shape in said mold while causing relative rotation between the blank and the mold, all of said operations being performed while the blank is supported by the neck mold.

18. Apparatus for fabricating glassware, comprising a ram, a suction head mounted in said ram for rotary movement about a vertical axis, a suction mold associated with said head, means for moving said ram, said head, and said mold toward and away from a gathering pool, and separable members for rotating said head in said ram, the movements of said ram operating to connect and disconnect said members.

19. Apparatus for fabricating glassware, comprising a ram, a suction head mounted in said ram for rotary movement about a horizontal axis, a suction mold associated with said head, means for moving said ram, said head, and said mold toward and away from a gathering pool, and separable members for rotating said head about the said horizontal axis, the movements of said ram operating to connect and disconnect the said members.

20. Apparatus for fabricating glassware, comprising a rotary table, a ram carried by said table, a suction head mounted in said ram for rotation about a vertical axis, a suction mold associated with said head, means for rotating said head, said means including a clutch carried by said table, and means operating in response to the rotation of said table for engaging and disengaging said clutch.

21. Apparatus for fabricating glassware, comprising a rotary table, a ram mounted on said table, a suction head supported by said ram, a suction mold associated with said head, and primary means and secondary means for moving said ram radially of said table.

22. Apparatus for fabricating glassware, comprising a rotary table, a ram mounted on said table, a suction head carried by said ram, a suction mold associated with said head, means for reciprocating said ram rectilinearly in an inclined path, and means for reciprocating said ram rectilinearly in a horizontal path.

23. Apparatus for fabricating glassware, comprising a rotary table, a ram carried by said table, a suction head supported by said ram, a suction mold associated with said head, primary means and secondary means for moving said ram radially of said table, one of said means including separable operating members, and means operating in response to the radial movements of said ram for engaging and disengaging said members.

24. Apparatus for fabricating glassware, comprising a suction head, a suction mold associated with said head, means for moving said head and mold toward and away from a gathering position above a pool of glass, means for creating a vacuum in said head and mold to draw a charge of glass into said mold at the gathering position, means for disengaging the mold and charge, leaving a formed blank supported by said head and exposed to the atmosphere, means for subjecting the exposed blank to puff-blowing air, means for reheating the exposed blank during the puff-blowing operation, said puff-blowing and reheating means serving to form a parison from the blank, a finishing mold, means for closing the finishing mold about the unconfined parison, means for subjecting the parison to final blowing pressure in the finishing mold, and means for causing relative rotation between the parison and the finishing mold during the final blowing operation, while the parison is supported by said head.

25. The method of manufacturing hollow glassware which comprises, gathering a charge of glass in a neck mold and an associated body mold from the surface of the pool of molten glass by suction, disengaging the body mold and the gathered charge to leave the major portion of the charge exposed to the atmosphere, expanding the charge while held by the neck mold until the glass approximates the size and shape of a finishing paste mold, closing the finishing paste mold about the expanded charge, blowing the charge to final form in the finishing paste mold, causing relative rotation between the glass supported by the neck mold and the finishing paste mold, and holding the glass by the neck mold in neck-up position during all manipulations of the glass after it is gathered.

26. Apparatus for forming hollow glassware comprising a neck mold and a body mold permanently associated therewith and individual thereto, means for moving said molds into a position above a pool of molten glass, means for applying vacuum in the molds to gather a charge by suction from the surface of said pool, means for disengaging the body mold and the charge, to leave the charge supported by the neck mold and exposed for the greater part to the atmosphere, means for applying blowing air to the unconfined charge to expand the charge to approximately the desired shape of a finishing paste mold forming a part of said apparatus, means for closing the finishing mold about the expanded glass prior to the opening of the neck mold, means for blowing the expanded glass to final form in the finishing mold while the glass is held by the neck mold, and means for effecting relative rotation between the finishing mold and the glass.

Signed at Hartford, Conn., this 5th day of June, 1928.

THOMAS WAUGH, Jr.